3,331,048
CONTACT ASSEMBLY FOR POTENTIOMETERS
Gilbert J. Orozco, New Rochelle, N.Y., assignor to Litton Industries, Inc., Beverly Hills, Calif.
Filed Feb. 5, 1964, Ser. No. 342,675
2 Claims. (Cl. 338—143)

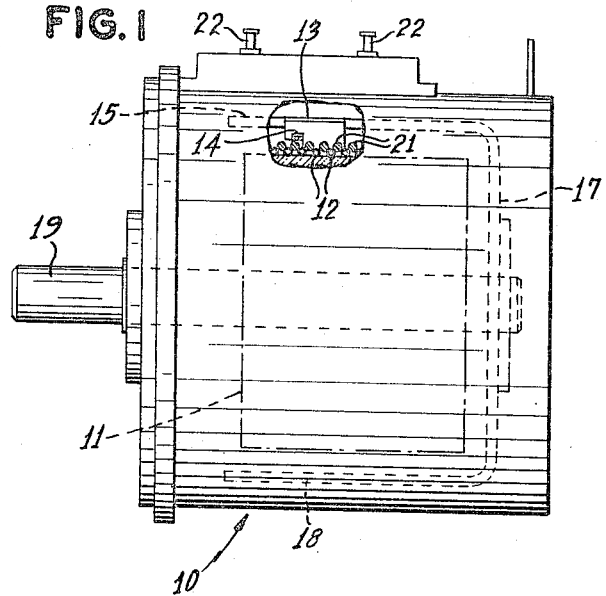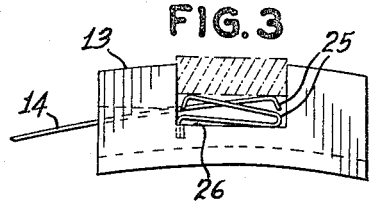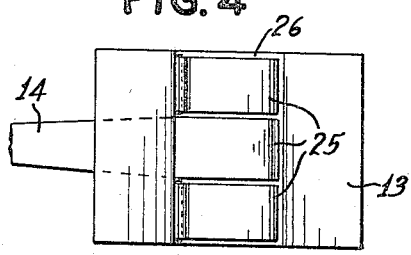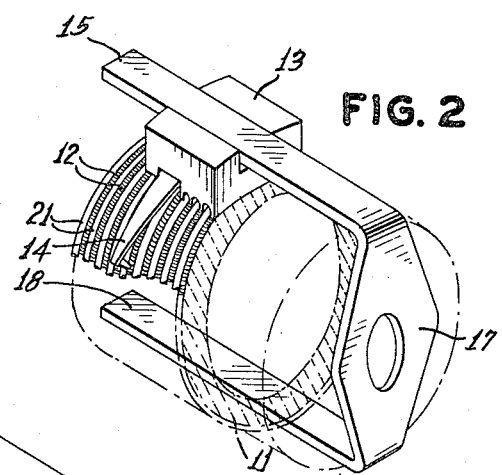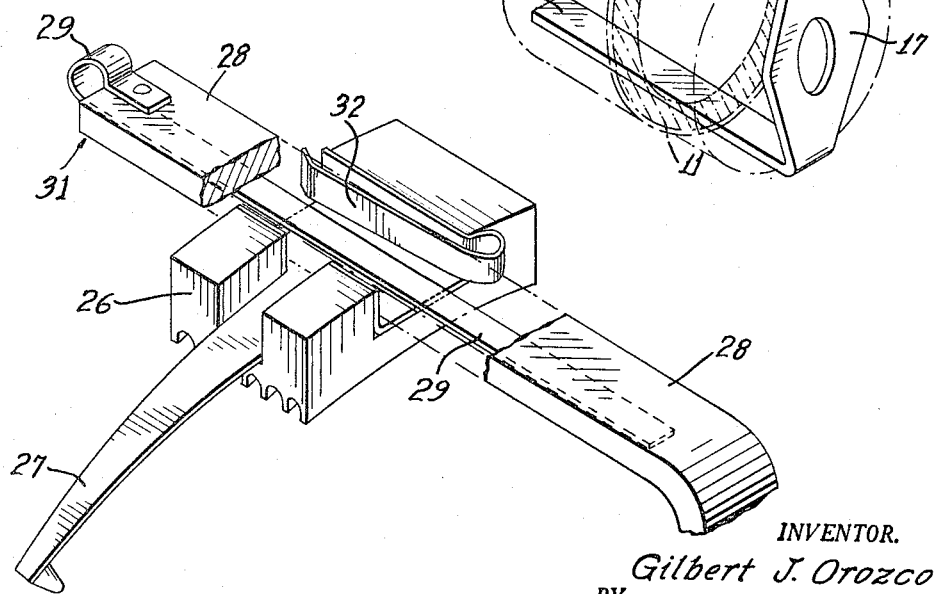
INVENTOR.
Gilbert J. Orozco
ATTORNEY

United States Patent Office 3,331,048
Patented July 11, 1967

This invention relates to potentiometers, and more particularly to a potentiometer contact assembly adapted to withstand external vibration or shock to which the potentiometer may be subjected in service.

The delicate contact of a precision potentiometer, especially of the multiturn type, may be deranged under conditions of excessive vibration of the potentiometer in service. If the mounting or support of the potentiometer is subjected to shock or vibration in a direction transverse to the contact member or its support, the contact member may be lifted off the surface of the resistance element or the contact pressure varied sufficiently to affect the operation of the instrument. In many instances, even a momentary failure of this character is extremely undesirable since the system in which the unit is connected may be seriously affected or even rendered inoperative. In the case of a multiturn potentiometer of the type having a projecting slider arm carried by the input shaft and supporting the slider-contact assembly, the unsupported end of the slider arm tends to oscillate or vibrate even for relatively small amplitude of externally applied forces, and it is one object of the invention to overcome this drawback in a simple and effective manner.

Another object of the invention is to improve the construction and operating characteristics of a multiturn potentiometer.

Another object of the invention is to provide a multiturn potentiometer of the type having a guide track adjacent the helical resistance element and a grooved contact-supporting member engaging said track, with resilient means for biasing said supporting member to maintain firm contact with the guide track when the potentiometer is subjected to shock or vibration of such magnitude as to cause displacement or vibration of the contact-supporting structure.

A still further object of the invention is to provide a potentiometer of the type having a resistance element surrounding the input shaft and a contact member attached to the rotatable shaft and engaging the inside or outside periphery of said resistance element, with resilient means for maintaining said contact member in engagement with said resistance element when the potentiometer is subjected to impact or vibration that would normally cause radial movement of the contact member.

In accordance with the invention as embodied in a multiturn potentiometer having a rotatable slider arm and a contact-slider assembly on said slider arm, resilient means is provided between the slider arm or other support and the contact-slider assembly to maintain the proper position of the assembly. In the case of a potentiometer provided with a guide track for the contact member, resilient means is provided in accordance with the invention for maintaining the contact support member in engagement with said guide track when the unit is subjected to impact or vibration. The resilient means employed may take the form of a leaf spring attached to or carried by the slider arm or by the contact slider assembly. In this manner, the potentiometer is enabled to withstand external impact or vibration that would otherwise affect the contact between the adjustable contact member and the resistance element.

Other objects and advantages of the invention will appear from the following description of the illustrative embodiments thereof shown in the accompanying drawings, wherein FIG. 1 is a side view of a multiturn potentiometer having a contact slider arm attached to the rear end of the rotatable input or adjusting shaft;

FIG. 2 is a detail view showing the relation of the slider and slider arm;

FIGS. 3 and 4 are side elevational and plan views to an enlarged scale of the slider shown in FIGS. 1 and 2; and FIG. 5 shows a modification.

Referring to FIG. 1 of the drawings, a multiturn potentiometer 10 is shown which comprises a conventional resistance element 11 in the form of a helix 12 wound on an insulating core, a slider assembly including the block as shoe 13 carrying the contact member or wiper 14, and a slider arm 15 on which the grooved slider 13 is mounted. As shown in FIG. 2, the slider arm 15 may be attached to or an integral part of a supporting member 17 having a second counter-balancing arm or extension 18, said member 17 being attached to the rear end of the rotatable input shaft 19. The slider block 13 is formed to provide clearance between the block and the underside of the slider arm 15. As shown, the block is grooved on the underside to fit the convolutions of an insulating guide wire or track 21 supported by the turns of the resistance element 12, so that as the shaft 19 is turned, the slider and its contact wiper 14 move progressively across the width of the resistance element 11 with the contact member maintained in contact with the outer periphery thereof. This construction employing a guide element 21 of helical form on the helical resistance element is disclosed in detail in the prior U.S. Letters Patent of J. W. Weidenman et al., No. 2,871,326, the disclosure of which is incorporated herein by reference. While this is the preferred construction, other equivalent feeding means may be employed, such as a feed or guide member on the slider engaging the resistance element 12. The mounting of the resistance element 11 and shaft 19, and the connections to the terminals 22, are not shown in detail since they may be of conventional character.

A multiturn potentiometer of this type, wherein the adjustable contact is attached to a slider which slides along the rotatable slider arm, has many advantages and has come into wisepread use. However if the unit is subjected to shock (impact or blow) or to substantial external vibration having a component transverse to its axis, the slider arm 15 tends to deflect and lift the contact member 14 from engagement with the resistance wire 12. In accordance with the invention, this drawback is overcome by providing resilient means to press the grooved slider block 13 against the guide track 21 and thereby maintain contact under high vibration. As a result the block is forced to vibrate in unison with the resistance element and core body, and the contact 14 remains in electrical contact with the resistance element.

As shown in FIGS. 3 and 4, the resilient means comprises one or more leaf springs 25, three in this instance, disposed in the bottom of the groove 26 in the slider block 13. The springs are made of an elastic metal or alloy. When the potentiometer is assembled, with the slider 13 in position between the slider arm 15 and the resistance element 11, the springs 25 are compressed and maintain film contact between the guide track 21 and the grooves in the underside of the slider 13. The grooves may be machined or moulded in the slider block, which is made of nylon or any other suitable insulating material. As shown, one of the springs 25 is integral with or attached to the shank of the contact member 14, thereby insuring good electrical connection between the said contact member and the slider arm 15 which is electrically connected to one of the terminals 22.

The resilient means for overcoming the effect of excessive vibration may take various forms, and other resilient materials such as rubber blocks may be used instead of elastic-metal springs. Furthermore the shape and arrangement of the pressure spring may be altered in many ways, in carrying out the invention; thus as shown in FIG. 5, a slider 26 carrying the movable contact member 27 and grooved to receive the slider arm 28 may be pressed against the track guide by a leaf spring 29, attached at one or both ends to the slider arm 28 with the center portion bearing against the slider. The leaf spring 29 may be formed, or shaped as by tapering the width thereof, to provide the desired pressure of the slider block 26 against the guide track underneath; for example with increasing pressure toward the unsupported end 31 of the slider arm where the deflection is greatest when the unit is subjected to vibration. An auxiliary spring 32 may also be provided at one side of the groove in the slider block 26 to maintain the alignment of the block with the slider arm 28 without binding. As shown the spring 32 is formed as an integral part of the wiper or contact element 27, thus providing a low-resistance electrical connection between the wiper and the arm 28.

In accordance with the invention, the provision of resilient means to hold the contact-supporting structure against the track guide overcomes a common deficiency of potentiometers of the type mentioned above, i.e., its failure to function normally or satisfactorily when subjected to shock or vibration. The invention thus extends the field of application of the unit to many uses where these adverse conditions exist.

It is to be understood that the above-described arrangements are illustrative of the application of the principles of the invention. Numerous other arrangements within the scope of the invention may be devised by those skilled in the art, in addition to those referred to above, such as variations in the form and arrangement of the resilient means for maintaining the adjustable contact in the desired relation to the contact surface of the resistance element. Accordingly, from the foregoing, it is evident that various changes may be made in the present invention without departing from the spirit of the invention as defined in the appended claims.

What is claimed is:

1. A multiturn potentiometer comprising
   a potentiometer resistive element including an insulating core and a helical resistance element thereon,
   a rotatable slider arm projecting over said resistive element parallel to the longitudinal axis thereof,
   means supporting said slider arm at one end thereof for rotation around the periphery of said helical resistance element,
   a slider assembly on said slider arm and movable along the length thereof, said slider assembly including a slider block engaging said resistive element and having clearance between an upper face of the block and the underside of the slider arm to permit impact movement of the projecting end of said arm toward and away from the resistive element without corresponding drive of said slider block,
   a contact wiper mounted on said slider assembly for making electrical connection to said resistance element, and
   resilient means disposed in the space between the slider block and slider arm for biasing said slider assembly and contact wiper away from the underside of said slider arm and toward the resistive element, said resilient means consisting of a leaf spring attached to said slider arm and extending substantially the entire length thereof to maintain engagement with the slider block as it is moved along the length of the slider arm and thereby hold the block and contact wiper in cooperative relation with the resistive element when the potentiometer is subjected to forces tending to vibrate the projecting end of the slider arm.

2. A multiturn potentiometer comprising
   an insulating core,
   a helical resistance element thereon,
   a helical guide track coextensive with and paralleling the turns of the helical resistance element and supported on said element,
   a rotatable slider arm projecting over said resistance element parallel to the longitudinal axis thereof,
   means supporting said slider arm at one end thereof for rotation around the periphery of said helical resistance element,
   a slider assembly on said slider arm and movable along the length thereof, said slider assembly including a slider block having clearance between an upper face of the block and the underside of said slider arm and being provided with a grooved underside portion fitting said helical guide track to position the slider assembly in relation to the resistance element as the slider arm is rotated around the periphery of said element,
   a contact wiper mounted on said slider assembly for making electrical connection to said resistance element, and
   resilient means disposed in the space between the slider block and slider arm for biasing said slider assembly and contact wiper away from the underside of said slider arm and toward the resistance element, to hold said block and contact wiper in cooperative relation with the guide track and helical resistance element when the potentiometer is subjected to forces tending to vibrate the projecting end of the slider arm.

References Cited

UNITED STATES PATENTS

| | | | |
|---|---|---|---|
| 1,606,153 | 11/1926 | Douglas | 338—148 |
| 1,785,779 | 12/1930 | Lauter | 338—147 |
| 1,793,090 | 2/1931 | Hite | 338—202 X |
| 2,839,643 | 6/1958 | Vercesi | 338—148 |
| 2,871,326 | 1/1959 | Weidenman | 338—148 |
| 2,979,683 | 4/1961 | Altieri | 338—143 |
| 3,119,088 | 1/1964 | Fliegler | 338—143 |

RICHARD M. WOOD, *Primary Examiner.*

J. G. SMITH, *Assistant Examiner.*